No. 855,915. PATENTED JUNE 4, 1907.
P. E. WELTON.
CLUTCH.
APPLICATION FILED MAY 25, 1906.

2 SHEETS—SHEET 1.

Witnesses.
E. B. Gilchrist
H. P. Sullivan

Inventor:
Park E. Welton
by
Thurston Woodward
his attorneys

No. 855,915. PATENTED JUNE 4, 1907.
P. E. WELTON.
CLUTCH.
APPLICATION FILED MAY 25, 1906.

2 SHEETS—SHEET 2.

Witnesses
E. B. Gilchrist
H. P. Sullivan

Inventor
Park E. Welton
by
Thornton Woodward
his attorney

UNITED STATES PATENT OFFICE.

PARK E. WELTON, OF AKRON, OHIO, ASSIGNOR TO EDWIN J. CAUFFIELD, OF AKRON, OHIO.

CLUTCH.

No. 855,915.  Specification of Letters Patent.  Patented June 4, 1907.

Application filed May 25, 1906. Serial No. 318,616.

*To all whom it may concern:*

Be it known that I, PARK E. WELTON, a citizen of the United States, residing at Akron, in the county of Summit and State of Ohio, have invented a certain new and useful Improvement in Clutches, of which the following is a full, clear, and exact description.

The object of the invention is to provide a friction clutch for connecting at will two members which are independently rotatable about the same axis; and to do this in such a way that when the clutch is thrown in, the non-rotating member will be started slowly, and the friction surfaces will be automatically brought together with a force which increases proportionately with the load, so as to ultimately cause the driving and driven members to rotate in unison.

The invention may be summarized as the combinations of parts hereinafter described and definitely pointed out in the claims.

Figure 1:
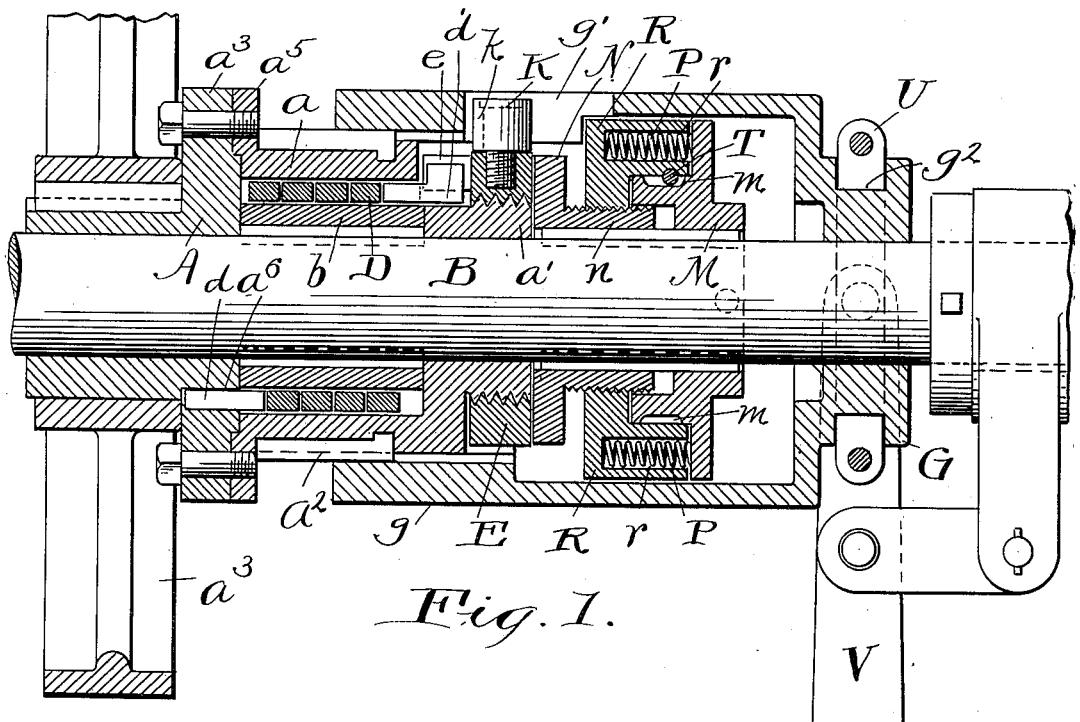
Figure 2:
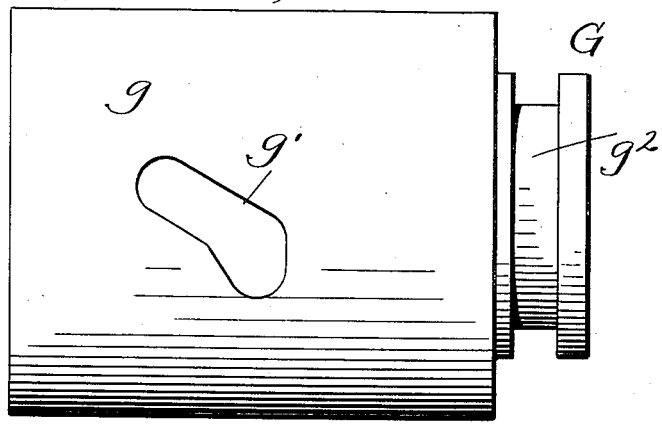
Figure 3:
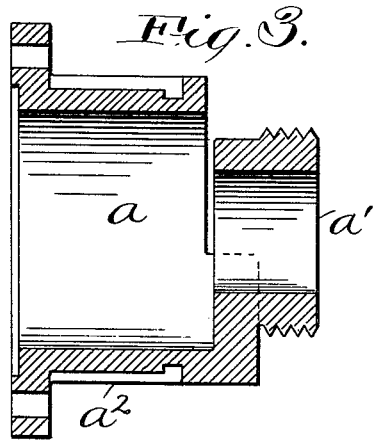
Figure 4:
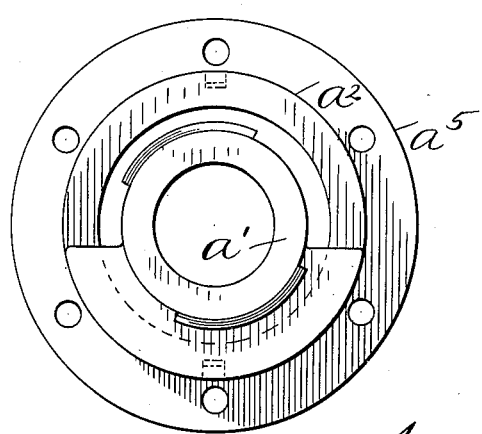
Figure 5:
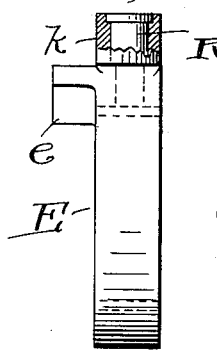
Figure 6:
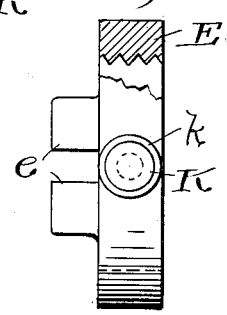
Figure 7:
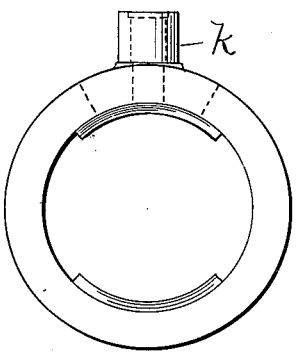
Figure 8:
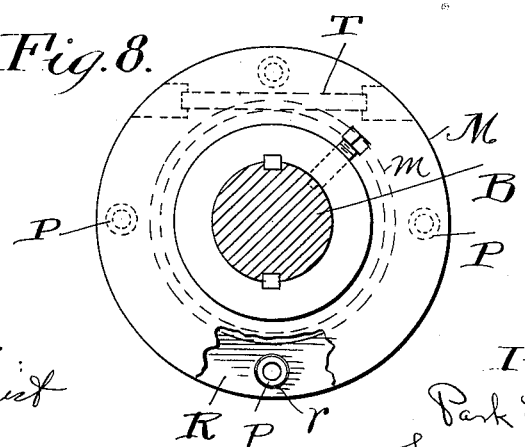

In the drawings, Figure 1 is a central longitudinal section of a clutch embodying the present invention. Fig. 2 is a plan view of the sliding sleeve of the clutch. Fig. 3 is a longitudinal central section and Fig. 4 a right end view of the part $a\ a'$ of the driven member. Figs. 5 and 6 are edge views partly sectioned, taken from points 90° apart showing the screw ring C of the clutch. Fig. 7 is an end view of said ring. Fig. 8 is a transverse sectional view in the plane indicated by line 8—8 of Fig. 1.

Referring to the parts by letters, B represents a rotatable shaft, which in the ordinary use of the clutch will serve as the driving member.

A represents the driven member which is a built-up structure; rotatably mounted upon shaft B. It consists of two separated sleeves $a\ a'$, which are rotatably fitted to the shaft B, and an intermediate drum $a^2$ of larger internal diameter. A pulley or gear $a^3$ may be keyed to the sleeve $a$. The sleeve $a'$ is exteriorly threaded, and upon this threaded portion a ring E is screwed.

The clutching spiral D surrounds the shaft B, or preferably a bushing $b$ keyed to the shaft. This spiral is preferably a spiral spring, although it might be a flexible cord, rope or cable depending upon the size of the clutch. One end of the spiral must be secured to the member A and the other end must be connected with the ring E.

When the clutching spiral is a spring, one end $d$ is bent into a position substantially parallel with the axis of this spiral, and this end is inserted into a notch $a^6$ in the member A. The other end $d'$ of said spiral is bent in the opposite direction and goes between two lugs $e\ e'$ on the ring E. It is evident therefore, that if the ring E be turned upon the member A, this spiral will be wound up and caused to grip the inclosed shaft or bushing $b$, whereby said bushing and shaft and member A must rotate together, provided the spiral does not slip upon the shaft.

The shifting sleeve G slides upon shaft B, and is provided with a drum extension $g$, which embraces the drum $a^2$ and has a tongue and groove connection therewith, whereby said sleeve is permitted to move longitudinally with respect to the member A, but must rotate in unison with it. In this drum is a diagonal slot $g'$, and into this slot a friction roller $k$ extends, which roller is mounted on a stud K, screwed into the ring E. It is evident therefore, that by moving the sleeve G longitudinally, the ring E will be turned upon the member A in that direction which will wind up the clamping spiral and cause it to close in upon and grip the shaft.

Probably if no means were provided for causing the spiral to grip the shaft other than the mechanism above described, the clutch would not be very efficient, except possibly in very small sizes; at any rate it would be very much less efficient than it is by reason of the additional mechanism now to be described.

Pinned to the shaft, but within the drum $g$ is a collar M. A sleeve $n$ is connected with the shaft by means of a tongue and groove which compels it to rotate in unison with the shaft, but permits it to move lengthwise thereon. This sleeve $n$ is provided with a friction disk N which is opposed to the face of the ring E, and is normally in close proximity thereto but not in contact therewith. This disk is under the influence of springs which yieldingly push it toward said ring. In the structure shown, this spring pressure is derived from springs P occupying recesses in a sleeve R which is screwed on the sleeve $n$. These springs P are compressed in the recesses r, and they thrust against the bottom of said recesses and against the face of the sleeve N. Since the sleeve R is screwed on to the sleeve n, it is evident that these springs exert their force in the direction tending to move sleeve n and its friction disk N toward the ring E. To adjust these springs to regulate their force it is only necessary to turn the sleeve R upon the sleeve n. The spring actuated movement of sleeves n and R, is limited by a pin T carried by sleeve R, which pin projects into an annular groove m in collar M.

When as before stated, the sleeve G is moved to the left as shown in Fig. 1, its slot $g'$ acting upon the roller k turns the ring E in the clutching direction. It will be remembered, however, that ring E is screwed on to the sleeve $a'$. The turning of said ring therefore, causes it to move lengthwise upon said sleeve, and this movement is toward the friction disk N, and is sufficient to move it against said disk N with considerable force. This turning of the ring E should be sufficient to wind the spiral upon the shaft but not very tightly. The rotary motion of the shaft may, if the grip of the spiral is tight enough, overcome the inertia of the driven member, and slowly start it to rotating. In any event there will be enough friction between the engaging faces of the disk N and the ring E to additionally turn the latter in the direction which will still further wind up the spiral spring. This rotary movement of the ring E also moves it still further toward, and more firmly into contact with the rotating but longitudinally yielding disk N, thereby increasing the friction between them, and these actions go on automatically so long as the shaft B and member A do not rotate in unison, and until the spiral has been so tightened upon the shaft that said shaft cannot slip in the spiral, when of course the shaft and member A must rotate in unison. The driven member is therefore started slowly and its speed gradually accelerated, the gripping power of the spiral being gradually and automatically increased in proportion to the load, so long as the load or its inertia tends to cause any difference in the speed at which the driving and driven members rotate.

The tightening movement of the ring E independently of the movement imparted to said ring by the sleeve G is permitted by reason of the fact that the diagonal slot $g'$ in the drum is widened out by cutting away that side of said slot as at $g^2$ which is opposed to the inclined side which by engagement with roller K turns said ring.

By moving sleeve G in the reverse direction, the ring E will be turned on sleeve $a'$ in the reverse direction, thereby withdrawing it from its contact with disk N, and at the same time loosening the spiral.

Any suitable mechanism may be employed for sliding the sleeve G lengthwise of the shaft. The mechanism is a familiar form and consists of a collar U in an annular groove $g^2$ on the sleeve, a fork lever V connected with said collar and suitably pivoted support for said lever.

It will be obvious to one skilled in this art that the broad invention herein disclosed and specified in the claims may be embodied in mechanism differing widely in details from that mechanism which is shown in the drawing. Therefore, although some of said novel details are of value in a practical embodiment of the invention, and are hereinafter claimed, it is not the intention that any of the claims shall be limited to the specific construction and its details to any greater extent than such limitations as are clearly expressed therein.

Having thus described my invention, I claim:

1. In a clutch, the combination of a rotatable driving member, the independently rotatable driven member, a ring supported by and adapted to be turned upon the driven member, a spiral around the driving member having one end connected with the driven member and one end with said ring, and means for turning said ring upon the driven member.

2. In a clutch, the combination of a rotatable driving member, the independently rotatable driven member, a ring supported by and adapted to be turned upon the driven member, and means for turning said ring upon the driven member a spiral around the driving member having one end connected with the driven member and one end with said ring, a friction disk rotatable with the driving member and means for yieldingly pressing the disk and ring together after the ring has been turned for the purpose specified.

3. In a clutch, the combination of the rotatable driving member, the independently rotatable driven member, a ring which is screwed upon the driven member, a spiral around the driving member having one end connected with the driven member and one end with said ring, a friction disk rotatable with but movable endwise upon the driving member, means for yieldingly pressing said disk toward said ring, and means for turning said ring upon the driven member.

4. In a clutch, the combination of the rotatable driving member, an independently rotatable driven member, a ring supported by and capable of being turned upon the driven member, a spiral around the driving member having one end connected with the driven member and one end with said ring, a sliding sleeve having a tongue and groove connection with the driven member and being provided with a diagonal slot, a projection secured to the ring and extending into said slot, and means for moving said sliding sleeve endwise.

5. In a clutch, the combination of a rotatable shaft, a driven member rotatably mounted upon said shaft and consisting of two separated sleeves and an intermediate drum of larger internal diameter, a ring rotatable upon said driven member, a spiral arranged around the shaft within the drum of said driven member and having one of its ends connected with the driven member and its other end connected with said ring, and means for turning said ring upon the driven member.

6. In a clutch, the combination of a rotatable shaft, a driven member rotatably mounted upon said shaft and consisting of two separated sleeves and an intermediate drum of larger internal diameter, a ring concentric with said driven member and screwed on to the same, a spiral around the shaft within the drum and having one of its ends connected with the driven member and the other end with said ring, a disk having a tongue and groove connection with the shaft, means for yieldingly pressing said disk toward said ring, and means for turning said ring upon said driven member.

7. In a clutch, the combination of a rotatable shaft, and a driven member rotatably mounted upon the shaft and comprising two sleeves and an intermediate drum of larger diameter, a ring concentric with said driven member and screwed on to one of the sleeves thereof, said ring having two shoulders, a spiral spring around the shaft within said drum having one end bent and inserted in a hole in the driven member, and having its other end bent and inserted between said shoulders on the ring, means for turning said ring, a disk having a tongue and groove connection with the shaft and means for yieldingly pressing said disk toward said ring.

8. In a clutch, the combination of a shaft, a driven member rotatable thereon, a ring concentric with said member and screwed on to the same, a spiral embracing the shaft and having one of its ends connected with said driven member and the other with said ring, a disk having a tongue and groove connection with the shaft, a spring acting to move said disk toward said ring and means for adjusting the tension of the spring and means for turning said ring on the driven member.

9. In a friction clutch, a collar fixed to the shaft, a sleeve $n$ having a tongue and groove connection with the shaft,—said sleeve being externally threaded,—a sleeve R screwed upon said threaded portion, a spring confined between said sleeve R and collar and exerting its force to thrust them apart and a ring E against which the end of sleeve $n$ may be pressed by the action of said spring.

10. In a friction clutch, a collar fixed to the shaft, a sleeve $n$ having a tongue and groove connection with the shaft,—said sleeve being externally threaded,—a sleeve R screwed upon said threaded portion, a spring confined between said sleeve R and collar and exerting its force to thrust them apart,—said collar having an annular groove—, a pin secured to said sleeve R in said groove and a ring E against which the spring may press the end of sleeve $n$.

In testimony whereof, I hereunto affix my signature in the presence of two witnesses.

PARK E. WELTON.

Witnesses:
J. M. WOODWARD,
H. R. SULLIVAN.